US012780409B2

(12) United States Patent
Tighe et al.

(10) Patent No.: US 12,780,409 B2
(45) Date of Patent: Nov. 3, 2026

(54) AIRCRAFT WITH TILTING FAN ASSEMBLIES

(71) Applicant: Wisk Aero LLC, Mountain View, CA (US)

(72) Inventors: James Joseph Tighe, San Jose, CA (US); Uri Tzarnotzky, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 19/030,381

(22) Filed: Jan. 17, 2025

(65) Prior Publication Data

US 2026/0116536 A1 Apr. 30, 2026

Related U.S. Application Data

(63) Continuation of application No. 17/162,313, filed on Jan. 29, 2021.

(Continued)

(51) Int. Cl.
*B64C 29/00* (2006.01)
*B64D 27/31* (2024.01)

(Continued)

(52) U.S. Cl.
CPC .......... *B64C 29/0033* (2013.01); *B64D 27/31* (2024.01); *B64D 27/34* (2024.01); *B64D 27/357* (2024.01); *B64D 31/16* (2024.01)

(58) Field of Classification Search
CPC ........................ B64C 29/0033; B64C 29/0025
See application file for complete search history.

(56) References Cited

U.S. PATENT DOCUMENTS 2,825,514 A 3/1958 Johann
2,940,691 A 6/1960 David (Continued)

FOREIGN PATENT DOCUMENTS

AU 2017200817 A1 8/2017
AU 2016238069 C1 6/2019

(Continued)

OTHER PUBLICATIONS

"35MW/11MWH Ess Project in Western Australia", Kokam by SolarEdge, 16 pages.

(Continued)

*Primary Examiner* — William L Gmoser
(74) *Attorney, Agent, or Firm* — Kilpatrick Townsend & Stockton LLP

(57) ABSTRACT

Embodiments provide an aircraft with one or more tilting fan assemblies that are configured to tilt between a forward flight position and a vertical lift position. The aircraft may also include a plurality of lift fan assemblies for vertical movement. The tilting fan assemblies may be coupled to the fuselage or wings of the aircraft via one or more tilting mechanisms. A control system coupled to the aircraft may control the one or more tilting mechanisms to move the tilting fan assemblies between the forward flight position and the vertical lift position. The tilting fan assemblies may be coupled to one or more support structures that are coupled the fuselage or wings of the aircraft.

21 Claims, 8 Drawing Sheets

Related U.S. Application Data

(60) Provisional application No. 62/968,852, filed on Jan. 31, 2020.

(51) Int. Cl.
*B64D 27/34* (2024.01)
*B64D 27/357* (2024.01)
*B64D 31/16* (2024.01)

(56) References Cited

U.S. PATENT DOCUMENTS

| | | | |
|---|---|---|---|
| 3,059,876 | A | 10/1962 | Platt |
| 3,081,964 | A | 3/1963 | Quenzler |
| 3,089,666 | A | 5/1963 | Quenzler |
| 3,161,374 | A | 12/1964 | Allred et al. |
| 4,828,203 | A | 5/1989 | Clifton et al. |
| 5,823,468 | A | 10/1998 | Bothe |
| 5,890,441 | A | 4/1999 | Swinson et al. |
| 6,184,656 | B1 | 2/2001 | Karunasiri et al. |
| 6,457,672 | B1 * | 10/2002 | Tai ...................... B64C 29/0033 244/76 R |
| 6,655,631 | B2 | 12/2003 | Austen-Brown |
| 7,874,513 | B1 | 1/2011 | Smith |
| 8,123,460 | B2 | 2/2012 | Collette |
| 8,471,529 | B2 | 6/2013 | Vance et al. |
| 8,485,464 | B2 | 7/2013 | Kroo |
| 8,707,721 | B2 | 4/2014 | Scherer et al. |
| 8,733,690 | B2 | 5/2014 | Bevirt et al. |
| 8,829,742 | B2 | 9/2014 | Wu et al. |
| 9,160,264 | B2 | 10/2015 | Hu |
| 9,172,120 | B2 | 10/2015 | Pariseau et al. |
| 9,266,607 | B2 | 2/2016 | Fink et al. |
| 9,321,368 | B2 | 4/2016 | Yang et al. |
| 9,437,850 | B2 | 9/2016 | Brockman et al. |
| 9,567,088 | B2 | 2/2017 | Godlasky et al. |
| 9,673,431 | B2 | 6/2017 | Despesse |
| 9,705,438 | B2 | 7/2017 | Zhao et al. |
| 9,764,833 | B1 | 9/2017 | Tighe et al. |
| 9,783,288 | B1 | 10/2017 | Moore et al. |
| 9,789,782 | B2 | 10/2017 | Holgers et al. |
| 9,840,161 | B2 | 12/2017 | Chikkannanavar et al. |
| 9,960,458 | B2 | 5/2018 | Weicker et al. |
| 10,029,785 | B2 | 7/2018 | Niedzballa |
| 10,040,363 | B2 | 8/2018 | Beaston et al. |
| 10,056,767 | B2 | 8/2018 | Troberg et al. |
| 10,110,033 | B1 | 10/2018 | Hom et al. |
| 10,118,695 | B2 | 11/2018 | Thomassin et al. |
| 10,124,890 | B2 | 11/2018 | Sada-Salinas et al. |
| 10,138,899 | B2 | 11/2018 | Joubert et al. |
| 10,144,507 | B2 | 12/2018 | Chretien |
| 10,162,367 | B2 | 12/2018 | Douglas et al. |
| 10,298,026 | B2 | 5/2019 | Trimboli et al. |
| 10,322,814 | B1 | 6/2019 | Tian |
| 10,364,036 | B2 | 7/2019 | Tighe et al. |
| 10,472,058 | B2 | 11/2019 | Tian |
| 10,518,875 | B2 | 12/2019 | Judas et al. |
| 10,526,083 | B2 | 1/2020 | Shaw |
| 10,559,861 | B2 | 2/2020 | Zheng et al. |
| 10,608,505 | B1 | 3/2020 | Long et al. |
| 10,625,870 | B1 | 4/2020 | Melack et al. |
| 10,649,468 | B2 | 5/2020 | Cutler et al. |
| 10,870,485 | B2 | 12/2020 | Reichert et al. |
| 10,914,789 | B2 | 2/2021 | Lemkin et al. |
| 11,072,423 | B1 | 7/2021 | Robertson et al. |
| 11,643,200 | B2 | 5/2023 | Lee et al. |
| 11,975,830 | B2 | 5/2024 | Tighe et al. |
| 12,006,033 | B1 | 6/2024 | Villa et al. |
| 2003/0094537 | A1 | 5/2003 | Austen-Brown |
| 2004/0107013 | A1 | 6/2004 | Fuller et al. |
| 2007/0057113 | A1 | 3/2007 | Parks |
| 2007/0158494 | A1 | 7/2007 | Burrage |
| 2009/0251100 | A1 | 10/2009 | Incledon et al. |
| 2009/0286149 | A1 | 11/2009 | Ci et al. |
| 2010/0001120 | A1 | 1/2010 | Sun |
| 2010/0136390 | A1 | 6/2010 | Ueda et al. |
| 2010/0301168 | A1 | 12/2010 | Raposo |
| 2011/0036938 | A1 | 2/2011 | Blomeley |
| 2011/0315809 | A1 | 12/2011 | Oliver |
| 2012/0261523 | A1 | 10/2012 | Shaw |
| 2013/0020429 | A1 | 1/2013 | Kroo |
| 2013/0026305 | A1 | 1/2013 | Wang |
| 2013/0069594 | A1 | 3/2013 | Jung |
| 2013/0126680 | A1 | 5/2013 | Hamke et al. |
| 2013/0311008 | A1 | 11/2013 | Kroo |
| 2014/0125284 | A1 | 5/2014 | Qahouq |
| 2015/0136897 | A1 | 5/2015 | Seibel et al. |
| 2015/0175260 | A1 | 6/2015 | Hesselbarth |
| 2015/0344134 | A1 | 12/2015 | Cruz Ayoroa |
| 2016/0023527 | A1 | 1/2016 | Dietrich |
| 2016/0031555 | A1 | 2/2016 | Bevirt et al. |
| 2016/0031556 | A1 | 2/2016 | Bevirt et al. |
| 2016/0115864 | A1 | 4/2016 | Campbell et al. |
| 2016/0134160 | A1 | 5/2016 | Schultz et al. |
| 2016/0207625 | A1 | 7/2016 | Judas et al. |
| 2016/0241058 | A1 | 8/2016 | Carralero et al. |
| 2016/0244158 | A1 | 8/2016 | Fredericks et al. |
| 2016/0297520 | A1 | 10/2016 | Sada-Salinas et al. |
| 2016/0336623 | A1 | 11/2016 | Nayar et al. |
| 2016/0340035 | A1 | 11/2016 | Duru |
| 2017/0301907 | A1 | 10/2017 | Park et al. |
| 2018/0043789 | A1 | 2/2018 | Goetz |
| 2018/0086448 | A1 | 3/2018 | Kroo et al. |
| 2018/0105267 | A1 | 4/2018 | Tighe et al. |
| 2018/0105268 | A1 | 4/2018 | Tighe et al. |
| 2018/0105279 | A1 | 4/2018 | Tighe et al. |
| 2018/0215464 | A1 | 8/2018 | Vetter et al. |
| 2018/0215465 | A1 | 8/2018 | Renteria |
| 2018/0346108 | A1 | 12/2018 | Sheng et al. |
| 2018/0362154 | A1 | 12/2018 | Louis et al. |
| 2018/0370629 | A1 | 12/2018 | Finlay et al. |
| 2019/0009895 | A1 | 1/2019 | Tu |
| 2019/0033890 | A1 | 1/2019 | Douglas et al. |
| 2019/0061901 | A1 | 2/2019 | Long |
| 2019/0092461 | A1 | 3/2019 | Duffy et al. |
| 2019/0100313 | A1 | 4/2019 | Campbell |
| 2019/0127056 | A1 | 5/2019 | Weekes et al. |
| 2019/0127061 | A1 * | 5/2019 | McLaren ................ B64C 11/28 |
| 2019/0135424 | A1 | 5/2019 | Baity et al. |
| 2019/0135425 | A1 | 5/2019 | Moore et al. |
| 2019/0256194 | A1 | 8/2019 | Vander Lind et al. |
| 2019/0291862 | A1 | 9/2019 | Lyasoff et al. |
| 2019/0329882 | A1 | 10/2019 | Baity et al. |
| 2020/0140079 | A1 | 5/2020 | Campbell |
| 2020/0164972 | A1 | 5/2020 | Kiesewetter et al. |
| 2020/0164974 | A1 | 5/2020 | Parks |
| 2020/0239134 | A1 | 7/2020 | Robertson et al. |
| 2020/0269975 | A1 | 8/2020 | Axel et al. |
| 2020/0290742 | A1 | 9/2020 | Kumar et al. |
| 2020/0301446 | A1 | 9/2020 | Leong |
| 2020/0346736 | A1 | 11/2020 | Krasnoff |
| 2020/0354049 | A1 | 11/2020 | Noppel et al. |
| 2020/0391862 | A1 | 12/2020 | Groninga et al. |
| 2020/0407060 | A1 | 12/2020 | Hosseini |
| 2021/0016877 | A1 | 1/2021 | Hohenthal |
| 2021/0031910 | A1 | 2/2021 | Cornes |
| 2021/0094685 | A1 | 4/2021 | Klemen |
| 2021/0107620 | A1 | 4/2021 | Weekes et al. |
| 2021/0107667 | A1 | 4/2021 | Sinha et al. |
| 2021/0206487 | A1 | 7/2021 | Iqbal et al. |
| 2021/0253234 | A1 | 8/2021 | Tao et al. |
| 2022/0009626 | A1 | 1/2022 | Baharav et al. |
| 2024/0308655 | A1 * | 9/2024 | Villa ................... B64C 29/0033 |

FOREIGN PATENT DOCUMENTS

| | | | |
|---|---|---|---|
| CN | 103796917 | A | 5/2014 |
| CN | 105480416 | A | 4/2016 |
| CN | 106573678 | A | 4/2017 |
| CN | 106864747 | A | 6/2017 |
| CN | 107244415 | A | 10/2017 |
| CN | 107628244 | A | 1/2018 |
| CN | 108860582 | A | 11/2018 |
| CN | 208149601 | U | 11/2018 |
| CN | 109263934 | A | 1/2019 |

(56) References Cited

FOREIGN PATENT DOCUMENTS

| | | | |
|---|---|---|---|
| CN | 109720564 | A | 5/2019 |
| CN | 109969392 | A | 7/2019 |
| CN | 110035954 | A | 7/2019 |
| CN | 110450948 | A | 11/2019 |
| DE | 102014000509 | A1 | 7/2015 |
| DE | 102017118965 | A1 | 2/2019 |
| EP | 3251882 | B1 | 4/2019 |
| EP | 3466812 | A1 | 4/2019 |
| EP | 3597528 | A1 | 1/2020 |
| GB | 2545700 | A | 6/2017 |
| JP | 01201294 | A | 8/1989 |
| JP | 2017507843 | A | 3/2017 |
| JP | 2017159888 | A | 9/2017 |
| KR | 102179828 | B1 | 11/2020 |
| WO | 2015143093 | A2 | 9/2015 |
| WO | 2017109500 | A1 | 6/2017 |
| WO | 2018064209 | A1 | 4/2018 |
| WO | 2018130020 | A1 | 7/2018 |
| WO | 2019034765 | A1 | 2/2019 |
| WO | 2019202325 | A1 | 10/2019 |
| WO | 2019211875 | A1 | 11/2019 |
| WO | 2020058706 | A1 | 3/2020 |

OTHER PUBLICATIONS

"A Year Gone By. 365 Days of Endless Traffic", Case 3:21-cv-02450-WHO, Document 58-41, Available Online at https://wisk.aero/news/blog/365-days/, Dec. 27, 2018, 6 pages.
"Archer Aviation Inc's Invalidity Contentions", Case No. 3:21-CV-02450-WHO, Oct. 11, 2021, 42 pages.
"Arcturus Complete VTOL C4ISR Solution", Jump, Arcturus UAV, Aug. 11, 2017, 2 pages.
"AW609 Tiltrotor", Leonardo Helicopters Division, 2021, 5 pages.
"Battery Charger Multi XS 25000, XS 25000 Multi Xt 14000, XT 14000", CTEK, Available Online at: https://docs.rs-online.com/15d2/0900766b81335f57.pdf, Feb. 27, 2020, 8 pages.
"Bell Boeing V-22 Osprey: One Aircraft—Multiple Missions", A New Era in Vertical Flight, 2017, 2 pages.
"Li-Ion BMS Cell-Board Processor", Lithiumate EL01, Oct. 20, 2011, 14 pages.
"Li-Ion BMS Controller Processor", Lithiumate EL02, Oct. 20, 2011, 9 pages.
"Lithium Ion Battery Monitoring System", Analog Devices AD7280A, 2011, 48 pages.
"Lithium Power BMS Manual", GTBMS005A-MC8, Harbin Guantuo Power Equipment Co., Ltd., Jul. 22, 2009, 12 pages.
"Minimum Operational Performance Standards for Rechargeable Lithium Batteries and Battery Systems", RTCA Inc., Dec. 19, 2017, 94 pages.
"Minimum Operational Performance Standards for Rechargeable Lithium Battery Systems", RTCA Inc., Mar. 13, 2008, 70 pages.
"Owner's Guide : RXV Elite Freedom", EZGO: A Textron Company, 2017, 60 pages.
"Pipistrel Alpha Electro Information Pack", Pipisrel, Revision 05, Oct. 2017, pp. 1-23.
"Strings, Parallel Cells, and Parallel Strings", OrionBMS, Available Online at: https://www.orionbms.com/manuals/pdf/parallel_strings.pdf, pp. 1-17.
"This Week@ NASA", NASA TV, Jun. 17, 2016, 2 pages.
"U-Changer XP Rev 2 User Manual", Valence—Advanced Energy Systems, Document Version 4.8, Nov. 2011, 61 pages.
"Vahana, the Self-Piloted, eVTOL Aircraft from A3 by Airbus, Successfully Completes First FullScale Test Flight", Airbus, Feb. 2, 2018, 3 pages.
"WattsUP, the New 2-Seat Electric Trainer", Pipistrel Aircraft—News, Available Online at: http://www.pipistrel.si/news/wattsup-the-new-2seat-electric-trainer-took, 2 pages.
"X-57 Battery System Survives Flight-Condition, Thermal Runaway Testing", Case 3:21-cv-02450-WHO, Document 58-41, Available Online at https://www.nasa.gov/centers/armstrong/feature/X-57_battery_major_milestone.html, Dec. 13, 2017, 3 pages.
"XTI Aircraft Tri Fan 600", Electric VTOL News, 11 pages.
"XTI TriFan 665 Flies!", The Electric VTOL News, May 8, 2019, 8 pages.
U.S. Appl. No. 17/162,313 , "Final Office Action", Oct. 30, 2024, 20 pages.
U.S. Appl. No. 17/162,313 , "Final Office Action", Mar. 2, 2023, 24 pages.
U.S. Appl. No. 17/162,313 , "Non-Final Office Action", Jul. 8, 2024, 19 pages.
U.S. Appl. No. 17/162,313 , "Non-Final Office Action", Sep. 9, 2022, 25 pages.
U.S. Appl. No. 17/173,133 , "Corrected Notice of Allowability", Jan. 26, 2024, 9 pages.
U.S. Appl. No. 17/173,133 , "Final Office Action", Aug. 17, 2023, 35 pages.
U.S. Appl. No. 17/173,133 , "Non-Final Office Action", Mar. 15, 2023, 31 pages.
U.S. Appl. No. 17/173,133 , "Notice of Allowance", Jan. 9, 2024, 12 pages.
AEP6001442/2022 , "Office Action", Oct. 10, 2024, 10 pages.
Andrea , "Battery Management Systems for Large Lithium-Ion Battery Packs", Artech House, Sep. 30, 2010, 303 pages.
Bertorelli , "Airbus Announces Electric Aircraft", Avweb, Apr. 26, 2014, 1 page.
Bodson et al., "Control Allocation with Load Balancing", American Institute of Aeronautics and Astronautics, Aug. 10-13, 2009, pp. 1-13.
Bordignon , "Constrained Control Allocation for Systems with Redundant Control Effectors", Virginia Polytechnic Institute and State University ProQuest Dissertations Publishing, Dec. 19, 1996, 260 pages.
CA3,167,783 , "Office Action", Aug. 13, 2024, 4 pages.
CA3,169,650 , "Office Action", Oct. 24, 2024, 3 pages.
CA3167783 , "Office Action", Sep. 27, 2023, 5 pages.
CA3169650 , "Office Action", Oct. 11, 2023, 4 pages.
Chin et al., "Battery Evaluation Profiles for X-57 and Future Urban Electric Aircraft", American Institute of Aeronautics and Astronautics/Institute of Electrical and Electronics Engineers Electric Aircraft Technologies Symposium, Aug. 26-28, 2020, pp. 1-12.
Chin et al., "Battery Performance Modeling on Maxwell X-57", American Institute of Aeronautics and Astronautics, Jan. 6, 2019, pp. 1-15.
Clarke et al., "X-57 Power and Command System Design", Institute of Electrical and Electronics Engineers Transportation Electrification Conference and Expo, Jun. 22-24, 2017, 8 pages.
Cobb , "Four-Seat Sun Flyer in the Works", The Aircraft Owners and Pilots Association, Jul. 23, 2017, 3 pages.
De et al., "Low Inductance Axial Flux BLDC Motor Drive for More Electric Aircraft", 2011 Aerospace Conference, 2011, pp. 1-11.
Delong et al., "As 15531/MIL-STD-1553B Digital Time Division Command/Response Multiplex Data Bus", The Avionics Handbook, 2001, 29 pages.
EP21748185.2 , "Extended European Search Report", Nov. 20, 2023, 8 pages.
EP21779776.0 , "Extended European Search Report", Nov. 29, 2023, 8 pages.
Grady , "Pipistrel Introduces Alpha Electro", Apr. 14, 2015, 1 page.
Harkegard , "Efficient Active Set Algorithms for Solving Constrained Least Squares Problems in Aircraft Control Allocation", Proceedings of the 41st Institute of Electrical and Electronics Engineers Conference on Decision and Control, May 6, 2002, 25 pages.
Head , "EPS Aims to Become 'Household Name' in Electric Aviation", eVTOL, Available Online at https://evtol.com/features/eps-powering-electric-aviation-renaissance/, Dec. 5, 2019, 4 pages.
Hsu et al., "Balancing Charge/Discharge Management for Series/Parallel Battery Packs", 7th Institute of Electrical and Electronics Engineers Conference on Industrial Electronics and Applications, Jul. 2012, pp. 613-618.

(56) References Cited

OTHER PUBLICATIONS

Huber , "Electric Sun Flyer Plans Fall First Flight", Available Online at: https ://www.ainonline.com/aviation-news/general-aviation/2017-07-26/electric-sun-flyer-plans-fal1-first-flight, Jul. 26, 2017, 2 pages.
IDP00202208274 , "Office Action", Feb. 28, 2024, 7 pages.
IL1066433 , "Office Action", Oct. 31, 2024, 5 pages.
Ivler et al., "Evaluation of Control Allocation Techniques for a Medium Lift Tilt-Rotor", Presented at the AHS 71st Annual Forum, May 5-7, 2015, pp. 1-20.
Johansen et al., "Control Allocation—A Survey", Department of Engineering Cybernetics, Nov. 2, 2012, 22 pages.
JP2022-546400 , "Notice of Decision to Grant", Dec. 3, 2024, 2 pages.
JP2022-546400 , "Office Action", Aug. 1, 2024, 7 pages.
JP2022-548457 , "Notice of Decision to Grant", Jan. 7, 2025, 2 pages.
JP2022-548457 , "Office Action", Oct. 2, 2024, 7 pages.
Kahe , "Triple-Triple Redundant Reliable Onboard Computer Based on Multicore Microcontrollers", International Journal of Reliability, Risk and Safety: Theory and Application, vol. 1, No. 1, 2018, pp. 17-24.
Kellermann et al., "Design and Optimization of Ram Air-Based Thermal Management Systems for Hybrid-Electric Aircraft", Aerospace, vol. 8, No. 1, Dec. 2020, pp. 1-21.
Liu et al., "A Fast-Charging Switching-Based Charger With Adaptive Hybrid Duty Cycle Control for Multiple Batteries", Institute of Electrical and Electronics Engineers Transactions on Power Electronics, vol. 32, No. 3, Mar. 2017, pp. 1975-1983.
McSwain et al., "Greased Lightning (GL-10) Performance Flight Research—Flight Data Report", NASA, Nov. 2017, 79 pages.
Merheb et al., "Active Fault Tolerant Control of Octorotor UAV Using Dynamic Control Allocation", The 2014 International Conference on Intelligent Unmanned Systems, Sep. 2014, 6 pages.
Moore , "The Joby S2 VTOL Concept : Exploring the New Degrees of Design Freedom of Distrusted Electric Propulsion", Vertifile, Nov.-Dec. 2014, pp. 22-24.
Niles , "Pipistrel Flies WATTsUP Electric Trainer", AVweb, Aug. 24, 2014, 1 page.
Oppenheimer et al., "Control Allocation", Chapter 8, Archer-NDCA-00172099, pp. 8-1-8-24.
PCT/US2021/015789 , "International Preliminary Report on Patentability", Aug. 11, 2022, 15 pages.
PCT/US2021/015789 , "International Search Report and Written Opinion", Apr. 29, 2021, 17 pages.
PCT/US2021/017497 , "International Preliminary Report on Patentability", Aug. 25, 2022, 7 pages.
PCT/US2021/017497 , "International Search Report and Written Opinion", Sep. 28, 2021, 8 pages.
PH1-2022-551859 , "Notice of Allowance", Oct. 10, 2024, 2 pages.
PH1-2022-551859 , "Office Action", Jul. 11, 2024, 7 pages.
Quackenbush et al., "Analysis of Rotor/Airframe Interaction in Hover and Near-Hover Flight Conditions", AIAA SciTech 2019 Forum, Jan. 7-11, 2019, pp. 1-17.
Rapoport , "Airbus Pivots Electric Aircraft Plans", Archer-NDCA-00171664, Apr. 1, 2017, 1 page.
Sasaki et al., "A Statistical Method for Analyzing Lifetime of a Battery Pack", Institute of Electrical and Electronics Engineers Power & Energy Society General Meeting, Jul. 2015, 5 pages.
Schnulo et al., "Further Development of the NASA X-57 Maxwell Mission Planning Tool for Mods II, III, and IV", American Institute of Aeronautics and Astronautics, Aug. 2019, pp. 1-14.
Silva et al., "VTOL Urban Air Mobility Concept Vehicles for Technology Development", Aviation Technology, Integration, and Operations Conference, Jun. 25-29, 2018, pp. 1-16.
Stoll et al., "Conceptual Design of the Joby S2 Electric VTOL PAV", Aviation Technology, Integration, and Operations Conference, Jun. 16-20, 2014, pp. 1-6.
Szondy , "E-Fan Electric Aircraft makes First Public Flight", Archer-NDCA-00171660, Apr. 30, 2014, 4 pages.
Vegh et al., "Current Capabilities and Challenges of NDARC and SUAVE for eVTOL Aircraft Design and Analysis", 2019 AIAA/IEEE Electric Aircraft Technologies Symposium (EATS), Aug. 19-22, 2019, pp. 1-20.
Weeden et al., "Making Better use of Parallel Battery Strings at Solar Sites by the Inclusion of a Simple Monitoring Module", Institute of Electrical and Electronics Engineers, INTELEC—Twentieth International Telecommunications Energy, Oct. 1998, pp. 204-209.
Yoney , "Pipistrel Taurus Electro G2 takes to the Skies, Goes on Sale", Archer-NDCA-00171840, Feb. 25, 2011, 5 pages.
Young et al., "Simulated Rotor Wake Interactions Resulting from Civil Tiltrotor Aircraft Operations Near Vertiport Terminals", 51st AIAA Aerospace Sciences Meeting including the New Horizons Forum and Aerospace Exposition, Jan. 7-10, 2013, pp. 1-26.
Zhou et al., "Reconfigurable Control Allocation Technology Using Weighted Least Squares for Nonlinear System in Unmanned Aerial Vehicle", Session: IS-4: Intelligent Adaptation and Model Identification, Jun. 25, 2012, pp. 1-11.
AU2021214406 , "First Examination Report", Feb. 6, 2025, 4 pages.
AU2021214406 , "Notice of Acceptance", Feb. 24, 2025, 3 pages.
Application No. CN202180027527.1 , Office Action, Mailed On Mar. 13, 2025, 10 pages.
U.S. Appl. No. 19/029,720 , "Notice of Allowance", May 23, 2025, 11 pages.
CN202180025808.3 , "Office Action", Mar. 13, 2025, 25 pages.
U.S. Appl. No. 18/626,202 , Non-Final Office Action, Mailed On Sep. 17, 2025, 9 pages.
Application No. CN202180025808.3 , Office Action, Mailed On Sep. 12, 2025, 9 pages.
Application No. CN202180027527.1 , Office Action, Mailed On Sep. 12, 2025, 8 pages.
Application No. SG11202251294U , Written Opinion, Mailed On Sep. 11, 2025, 10 pages.
U.S. Appl. No. 17/162,313 , Final Office Action, Mailed On Oct. 8, 2025, 29 pages.
U.S. Appl. No. 19/030,813 , Final Office Action, Mailed On Oct. 8, 2025, 16 pages.
AU2021246913 , "First Examination Report", Oct. 8, 2025, 3 pages.
Application No. BR112022015125-0 , Office Action, Mailed On Oct. 14, 2025, 6 pages.
Application No. IL294867 , Notice of Allowance, Mailed On Oct. 23, 2025, 3 pages.
U.S. Appl. No. 18/626,202 , Notice of Allowance, Mailed on Nov. 18, 2025, 12 pages.
AU2025200657 , "First Examination Report", Nov. 17, 2025, 4 pages.
Application No. CN202180027527.1 , Office Action, Mailed On Nov. 27, 2025, 18 pages.
Application No. KR10-2022-7029390 , Office Action, Mailed On Oct. 30, 2025, 14 pages.
NZ792012 , "First Examination Report", Dec. 19, 2025, 4 pages.
U.S. Appl. No. 17/162,313 , Non-Final Office Action, Mailed on Jun. 11, 2025, 25 pages.
U.S. Appl. No. 19/030,813 , Non-Final Office Action, Mailed on Jun. 12, 2025, 16 pages.
Application No. CA3, 167,783 , Office Action, Mailed on Jul. 9, 2025, 4 pages.
Application No. EP21748185.2 , Office Action, Mailed On May 13, 2025, 5 pages.
Application No. EP21779776.0 , Office Action, Mailed on May 7, 2025, 4 pages.
Application No. CN202180025808.3 , Office Action, Mailed on Mar. 18, 2026, 3 pages.
Application No. IDP00202208274 , Office Action, Mailed on Jan. 28, 2026, 6 pages.
Application No. KR10-2022-7028282 , Office Action, Mailed on Mar. 19, 2026, 15 pages.
Application No. NZ792012 , Substantive Examination Report Received, Mailed on Mar. 27, 2026, 4 pages.

(56) References Cited

OTHER PUBLICATIONS

AU2021246913 , "Second Examination Report", Feb. 19, 2026, 3 pages.
Application No. JP2024-190013 , Office Action, Mailed on Jan. 8, 2026, 2 pages.
NZ791955 , "First Examination Report", Dec. 23, 2025, 4 pages.
U.S. Appl. No. 17/162,313 , Non-Final Office Action, Mailed on May 18, 2026, 29 pages.
U.S. Appl. No. 19/030,813 , Non-Final Office Action, Mailed on Apr. 24, 2026, 18 pages.
Application No. CA3, 167,783 , Office Action, Mailed on May 11, 2026, 5 pages.
Application No. CN202610227676.7 , Office Action, Mailed On May 15, 2026, 10 pages.
Application No. EP21779776.0 , Office Action, Mailed On May 8, 2026, 5 pages.
Application No. JP2025-016845 , Office Action, Mailed On May 12, 2026, 8 pages.
Application No. PH1-2024-552144 , Office Action, Mailed On Apr. 23, 2026, 5 pages.
IN202217044507 , "First Examination Report", Aug. 4, 2026, 10 pages.
NZ792012 , "Third Examination Report", Jun. 30, 2026, 6 pages.

* cited by examiner

AIRCRAFT WITH TILTING FAN ASSEMBLIES

RELATED APPLICATIONS

This application is a continuation of U.S. patent application Ser. No. 17/162,313 filed Jan. 29, 2021, and entitled "Aircraft with Tilting Fan Assemblies," which claims benefit under 35 USC § 119(e) to U.S. Provisional Patent Application No. 62/968,852 filed Jan. 31, 2020, and entitled "Aircraft with Tilting Fans", the disclosures of which are incorporated by reference herein in their entirety for all purposes.

FIELD

The described embodiments relate generally to an aircraft with vertical takeoff and landing capability. In particular, the embodiments provide an aircraft with one or more tilting fan assemblies which provide vertical and horizontal thrust in a controlled fashion for hover, transition and cruise flight.

BACKGROUND

Aircrafts with vertical takeoff and landing capability need lift fans to be able to hover, takeoff and land vertically. However, such aircrafts also need forward thrust to be able to cruise in the air. Thrust produced in the vertical direction provides lift to the vehicle; thrust produced horizontally provides forward movement. A vertical takeoff and landing (VTOL) aircraft should produce both vertical and horizontal thrust, and be able to control these forces in a balanced fashion.

SUMMARY

Various embodiments provide an aircraft configured for vertical takeoff and landing. The aircraft comprises a fuselage, a pair of wings coupled to opposite sides of the fuselage, a plurality of lift fan assemblies coupled to the pair of wings, a plurality of tilting fan assemblies and a control system. The plurality of lift fan assemblies are configured to create a vertical lift. The plurality of tilting fan assemblies are configured to move between a vertical lift position and a forward flight position. The control system is configurable to control the plurality of tilting fan assemblies between the vertical lift position and the forward flight position.

Some embodiments provide an aircraft configured for vertical takeoff and landing. The aircraft comprises a fuselage, a pair of wings coupled to opposite sides of the fuselage, a plurality of tilting fan assemblies coupled to the pair of wings configured to move between a vertical lift position and a forward flight position, and a control system configurable to control the plurality of tilting fan assemblies between the vertical lift position and the forward flight position. The plurality of tilting fan assemblies are configured to create a vertical lift when in the vertical lift position. The aircraft further includes one or more battery units including a plurality of battery cells configured to power the plurality of tilting fan assemblies.

Embodiments provide a method performed by a control system coupled to an aircraft configured for vertical takeoff and landing for controlling one or more tilting fan assemblies of the aircraft. The control system receives a flight instruction, determines a position of a plurality of tilting fan assemblies coupled to the aircraft, controls one or more of the plurality of tilting fan assemblies between a vertical lift position and a forward flight position based on the flight instruction; and continuously monitors the position of the plurality of tilting fan assemblies in view of the flight instruction.

If the flight instruction is a takeoff instruction or a landing instruction, the control system controls the one or more of the plurality of tilting fan assemblies that are in the forward flight position to the vertical lift position. If the flight instruction is a forward flight instruction, the control system controls the one or more of the plurality of tilting fan assemblies that are in the vertical lift position to the forward flight position.

These and other embodiments are described in further detail below.

DETAILED DESCRIPTION

Techniques disclosed herein relate generally to an aircraft with a plurality of lift fan assemblies, and at least one tilting fan assembly. More specifically, techniques disclosed herein provide a VTOL aircraft with a plurality of lift fan assemblies for vertical movement, and one or more tilting fan assemblies that are configured to tilt between a forward flight position and a vertical lift position for forward movement. Various inventive embodiments are described herein, including methods, processes, systems, devices, and the like.

In order to better appreciate the features and aspects of the fan assembly orientations for aircrafts according to the present disclosure, further context for the disclosure is provided in the following section by discussing particular implementations of a VTOL aircraft according to embodiments of the present disclosure. These embodiments are for example only and other fan configurations can be employed in connection with the VTOL aircraft described herein.

Figure 1A:
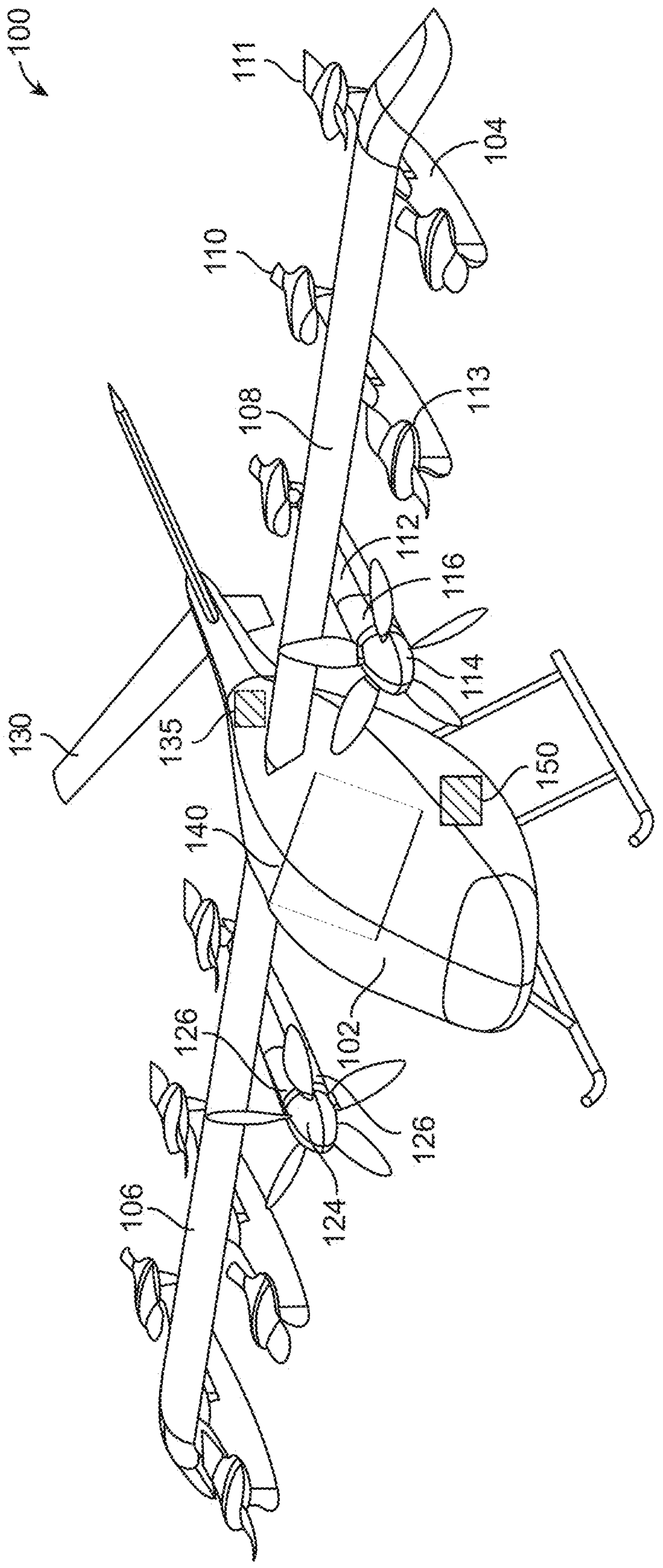
FIG. 1A depicts a simplified schematic of an exemplary VTOL aircraft, according to various embodiments.

FIG. 1A depicts a simplified schematic of an exemplary VTOL aircraft 100. According to various embodiments, the VTOL aircraft 100 may be an electrically powered aircraft. In some embodiments, the VTOL aircraft 100 may be configured to carry one or more passengers and/or cargo, and may be controlled automatically and/or remotely (e.g. may not require an on-board pilot to operate the aircraft, and may be controlled based on a control signal or instruction received from a remote entity). In the example shown in FIG. 1A, the VTOL aircraft 100 includes a fuselage 102 which may include a cabin section 140 for carrying passengers and/or cargo. For example, the cabin section 140 may be provided toward a nose of the VTOL aircraft 100. The VTOL aircraft 100 may also include a horizontal stabilizer (e.g. a tailplane) 130 coupled to a rear end of the fuselage 102. The tailplane 130 may be in any suitable shape or form. For example, the tailplane 130 may be V-shaped (e.g. V-tail). A pair of wings (e.g. a first wing 106 and a second wing 108) are coupled to opposite sides of the fuselage 102. In some embodiments, the pair of wings may be coupled to the fuselage in a high-wing configuration. That is, the pair of wings may be mounted on an upper portion of the fuselage, as shown in FIG. 1A. A plurality of fan assemblies (e.g. lift fan assemblies and/or tilting fan assemblies) may be coupled to the pair of wings. For example, the VTOL aircraft 100 may include a total of 12 fan assemblies (e.g. fans, rotors, propellers) divided equally between the wings. In some embodiments, the fan assemblies may be coupled directly to the wings. In other embodiments, the fan assemblies may be mounted on support structures 104, such as booms that may be coupled to an underside of the wings 106, 108.

According to some embodiments, each wing 106, 108 may include two support structures (e.g. booms) 104 each including a pair of lift fan assemblies (also known as "lift fans") 110 mounted thereon. For example, each lift fan assembly may be coupled to an end of the boom 104 such that a first lift fan assembly 113 is in front of the wing 106, 108 and a second lift fan assembly 110 is aft of the wing 106, 108. In some embodiments, the two lift fan assemblies 110, 113 coupled to opposite ends of the boom 104 may have their blades mounted with opposite angles of attack and thus, the two lift fan assemblies 110, 113 may spin in opposite directions. The lift fan assemblies 110, 113 are configured to create a vertical lift for the VTOL aircraft 100.

According to various embodiments, each lift fan assembly 110 may be in form of an electric motor-driven rotor (e.g. a combined fan and motor), and may be configured to move the aircraft 100 in the vertical direction during, for example, take-off, hovering and/or landing. The rotor may comprise blades attached to a hub, or may be manufactured as a single piece with an integral hub. The hub provides a central structure to which the blades connect, and in some embodiments is made in a shape that envelops the motor. In some embodiments the motor parts are low-profile so that the entire motor fits within the hub of the rotor, presenting lower resistance to the air flow when flying forward. The rotor is attached to the rotating part of the motor. The stationary part of the motor is attached to the boom 104. In some embodiments the motor is a permanent magnet motor and is controlled by an electronic motor controller. The electronic motor controller sends electrical currents to the motor in a precise sequence to allow the rotor to turn at a desired speed or with a desired torque.

The lift fan assembly 110 may have any suitable number of blades that may be oriented in a predetermined manner. The orientation of the lift fan assemblies may be fixed (e.g. the lift fan assemblies 110 may be mounted in a fixed position relative to the wings 106, 108). In some embodiments, one or more of the lift fan assemblies 110 may be configured to be repositioned relative to the wings 106, 108 manually or in response to a control signal (e.g. from a control system 150, such as a flight control system, controlling the VTOL aircraft 100). According to various embodiments, the lift fan assembly 110 may have 2 blades having a predetermined angle of attack. In some embodiments, two adjacent lift fan assemblies (e.g. lift fan assembly 110 and lift fan assembly 111) may have opposite angle of attacks such that the two adjacent fan assemblies spin in opposite directions. The two adjacent lift fan assemblies may be on a same wing (e.g. lift fan assemblies 110 and 111 in FIG. 1A) or on opposite wing (e.g. lift fan assemblies 117 and 118 in FIG. 1B). According to various embodiments, a first subset of the lift fan assemblies may spin in a first direction, and a second subset (e.g. remainder) of the lift fan assemblies may spin in a second direction, opposite to the first direction.

Figure 1B:
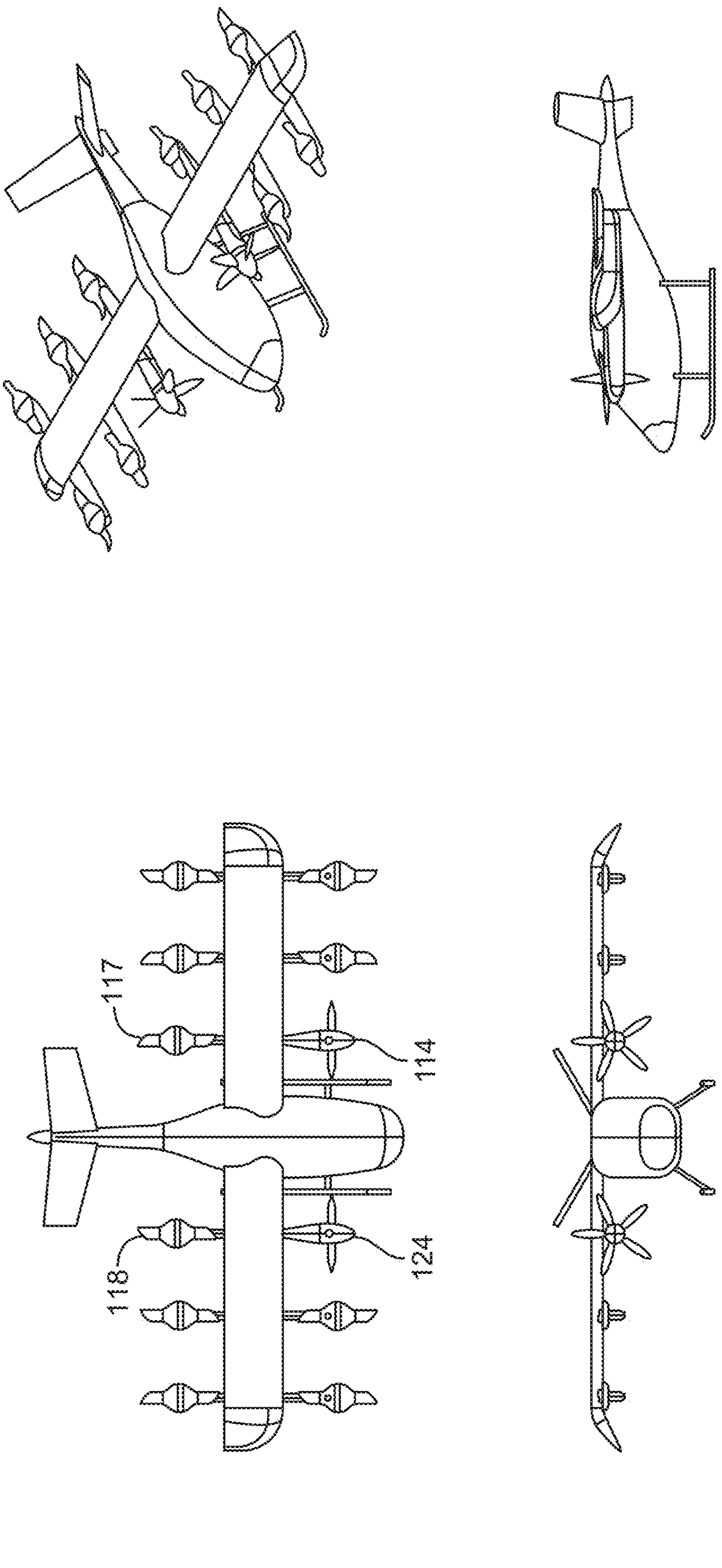
FIG. 1B illustrates top, planar, side and front views (clockwise starting from the top left corner) of the VTOL aircraft with a pair of tilting fan assemblies in the forward flight position, according to various embodiments.
Figure 1C:
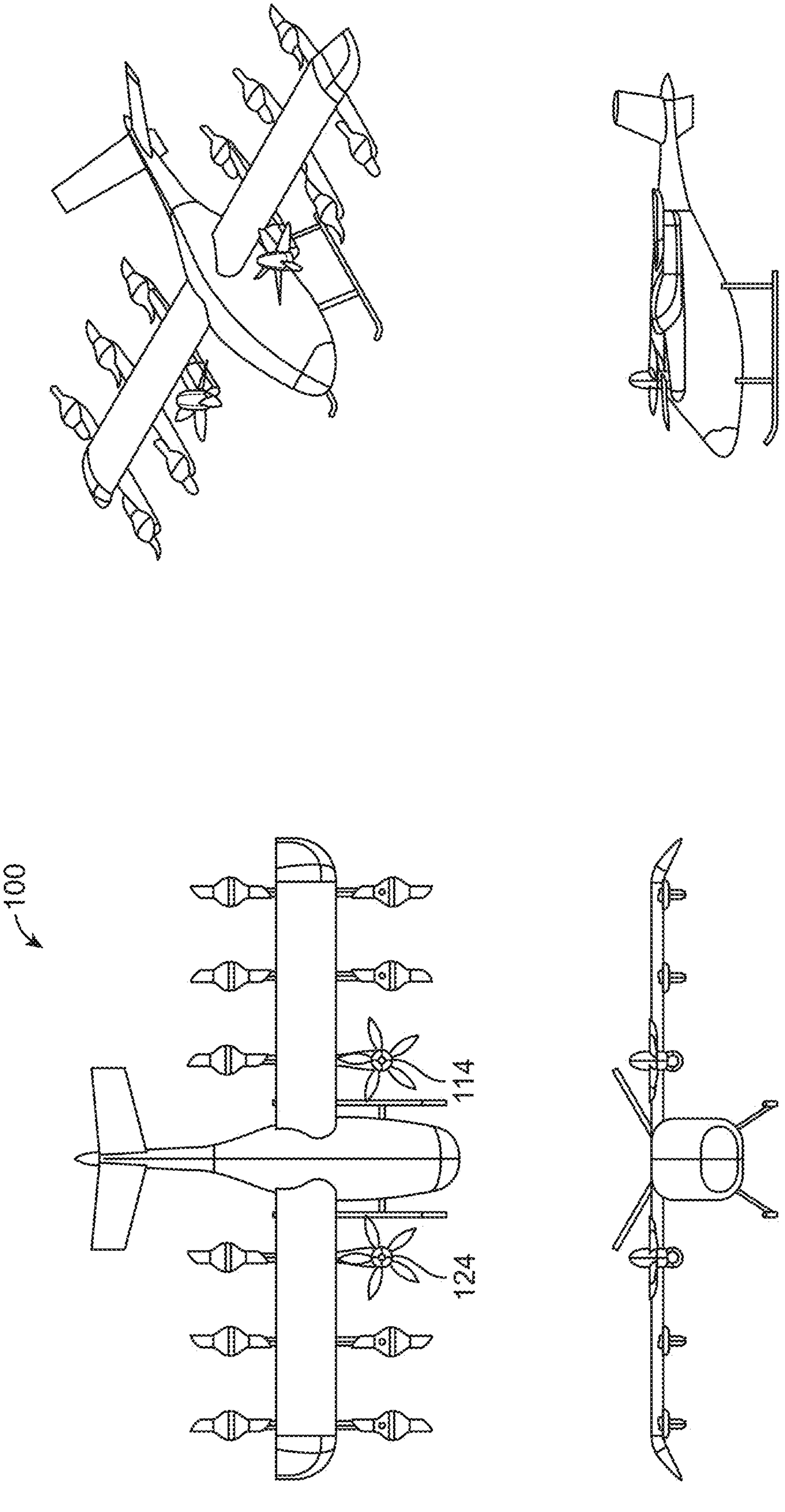
FIG. 1C illustrates top, planar, side and front views (clockwise starting from the top left corner) of the VTOL aircraft with a pair of tilting fan assemblies in the vertical lift position, according to various embodiments.

In some embodiments, each wing 106, 108 may include at least one support structure (e.g. boom) 112 carrying at least one tilting fan assembly 114 (also known in various embodiments as "propeller assembly" or "propeller fan assembly"). The tilting fan assembly 114 is configured to move between a forward flight position (as illustrated in FIG. 1B) and a vertical lift position (as illustrated in FIG. 1C). The boom 112 with the at least one tilting fan assembly 114 may be in addition to or instead of the boom(s) carrying lift fan assemblies. The tilting fan assembly 114 may be switched (e.g. rotated) between a forward flight position (illustrated in FIGS. 1A-1B) and a vertical lift position (illustrated in FIG. 1C). The tilting fan assembly 114 may be coupled to the boom 112 via a tilting mechanism 116 including, for example, motors and coupling mechanisms. In the forward flight position, the tilting fan assembly 114 may be substantially in a vertical orientation with respect to the fuselage 102. In the vertical lift position, the tilting fan assembly 114 may be substantially in a horizontal orientation with respect to the fuselage 102.

Each tilting fan assembly 114 may include a combined rotor and motor. The rotor may comprise blades attached to a hub, or may be manufactured as a single piece with an integral hub. The hub provides a central structure to which the blades connect, and in some embodiments is made in a shape that envelops the motor. In some embodiments the motor parts are low-profile so that the entire motor fits within the hub of the rotor, presenting lower resistance to the air flow when flying forward. The rotor is attached to the rotating part of the motor. The stationary part of the motor is attached to the boom 112 or other part of the fuselage 102. In some embodiments the motor is a permanent magnet motor and is controlled by an electronic motor controller. The electronic motor controller sends electrical currents to the motor in a precise sequence to allow the rotor to turn at a desired speed or with a desired torque. The tilting fan assembly 114 may have any suitable number of blades that may be oriented in a predetermined manner. For example, the tilting fan assembly 114 may have 5 blades having a predetermined angle of attack.

According to various embodiments, the tilting fan assembly 114 on the first wing 108 may tilt simultaneously with the tilting fan assembly 124 on the second wing 106. For example, the control system 150 of the aircraft may control at least a subset of the plurality of tilting fan assemblies simultaneously. That is, the control system 150 may operate the respective tilting mechanisms 116 and 126 substantially at a same time. In some embodiments, the tilting mechanisms 116 and 126 may be operated independently from each other. According to some embodiments, the control system 150 may be configurable to control the VTOL aircraft 100 (e.g. control the position of the tilting fan assemblies) automatically and/or remotely (e.g. via a control signal received from a remote entity, such as a remote controller, a remote pilot or a remote control tower). In various embodiments, the control system 150 comprises one or more processors configured to perform the processing and control functions described herein.

In some embodiments, each wing 106, 108 may also include at least one support structure (e.g. boom) 112 carrying one lift fan assembly 110 (e.g. an aft fan assembly) and one tilting fan assembly 114. For example the lift fan assembly 110 may be coupled aft of the wing 106, 108 and the tilting fan assembly 114 may be coupled forward of the wing 106, 108. According to various embodiments, a plurality of lift fan assemblies may be coupled to a trailing edge of the pair or wings 106, 108 and/or a plurality of tilting fan assemblies may be coupled to a leading edge of the pair of wings 106, 108 via one or more tilting mechanism(s).

The exemplary VTOL aircraft 100 illustrated in FIGS. 1A-1C may include a total of twelve fan assemblies: ten lift fan assemblies and two tilting fan assemblies. In some embodiments, at least one (or preferably a pair) of the fan assemblies of the exemplary VTOL aircraft are tilting fan assemblies. The tilting fan assemblies 114 and 124, when in the forward flight position, may provide the thrust for (and/or transition to) forward flight, climb, descent, and cruise. The lift fan assemblies 110 provide enough thrust to lift the aircraft off the ground and maintain control, for example during takeoff, hovering and/or landing. According to various embodiments, the lift fan assemblies 110 may stop operating during the forward flight of the VTOL aircraft 100.

One or more battery units 135 may be coupled to the VTOL aircraft 100 to power the fan assemblies (the lift fan assemblies and the tilting fan assemblies). More specifically, the fan assemblies may be driven by electric motors that are powered by a power system including the one or more battery units 135. In some embodiments, each fan assembly may have a dedicated battery unit 135. The battery units 135 may be provided on booms carrying the fan assemblies, within the fuselage or a combination thereof. Each battery unit 135 may include a plurality of battery cells configured to power the fan assemblies. Accordingly, the VTOL aircraft 100 may be an electric aircraft. In alternative embodiments, the VTOL aircraft 100 may be a hybrid-electric aircraft.

FIG. 1B illustrates top, planar, side and front views (clockwise starting from the top left corner) of the VTOL aircraft 100 with a pair of tilting fan assemblies 114, 124 in the forward flight position.

FIG. 1C illustrates top, planar, side and front views (clockwise starting from the top left corner) of the VTOL aircraft 100 with a pair of tilting fan assemblies 114, 124 in the vertical lift position.

The control system 150 (e.g. the flight control system) coupled to the aircraft 100 may be configured to control the plurality of tilting fan assemblies between the vertical lift position and the forward flight position. For example, the control system 150 may be configurable to control the tilting mechanism(s) 116, 126 to switch the positioning of the tilting fan assemblies 114, 124 from the forward flight position (illustrated in FIGS. 1A-1B) to the vertical lift position (illustrated in FIG. 1C); as well as from the vertical lift position (illustrated in FIG. 1C) to the forward flight position (illustrated in FIGS. 1A-1B). In some embodiments, the control system 150 may receive flight data from one or more sensors (e.g. sensor measuring air temperature, electric motor temperature, airspeed of the aircraft, etc.), computers, and other input/output devices coupled to the aircraft. The control system 150 may then control the tilting fan assemblies 114, 124 between the two positions based on sensor data and/or flight data received from the sensors (e.g. sensor measuring air temperature, electric motor temperature, airspeed of the aircraft, etc.), computers, and other input/output devices coupled to the aircraft.

According to various embodiments, the control system 150 may be configurable to receive a flight instruction, such as a takeoff, hover, cruise or landing instruction. The control system 150 may then determine a position of the plurality of tilting fan assemblies, and control one or more of the plurality of tilting fan assemblies between the vertical lift position and the forward flight position based on the flight instruction. During the operation of the VTOL aircraft 100, the control system 150 may be configurable to continuously monitor the position of the plurality of tilting fan assemblies in view of the flight instruction.

The exemplary VTOL aircraft 100 illustrated in FIGS. 1A-1C includes a pair of tilting fan assemblies 114, 124 one provided on each wing 106, 108, closer to the fuselage 102. One of ordinary skill the art will appreciate that the number and location of the tilting fan assemblies is not limited to that illustrated in FIGS. 1A-1C and that the VTOL aircraft can include less or more number of tilting fan assemblies and/or lift fan assemblies. For example, according to an embodiment, the boom 112 may switch places with any one of the booms 104. According to yet another embodiment, all front fan assemblies (or all aft fan assemblies) may be tilting fan assemblies.

Figure 2A:
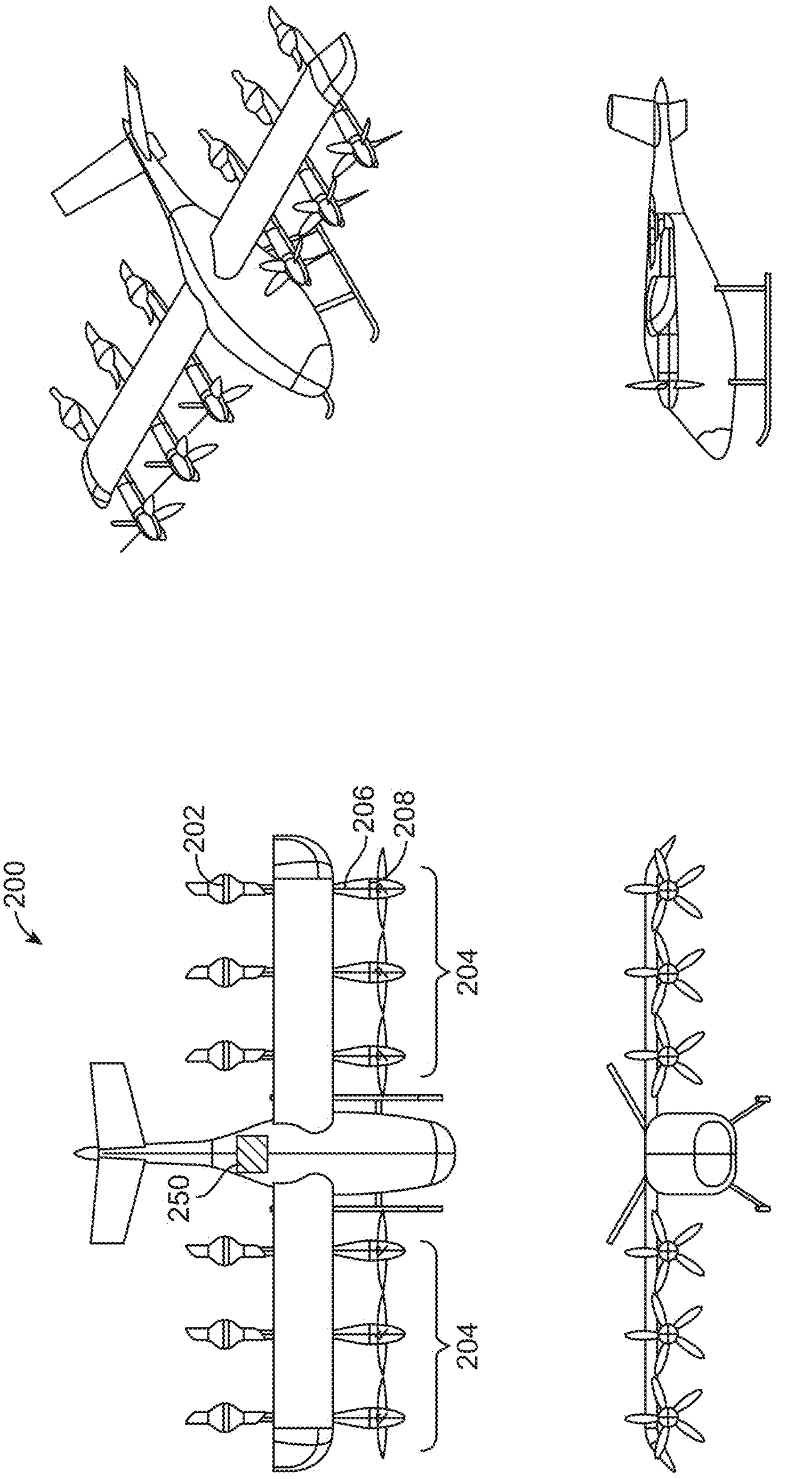
FIG. 2A illustrates top, planar, side and front views (clockwise starting from the top left corner) of the VTOL aircraft with front tilting fan assemblies in the forward flight position.
Figure 2B:
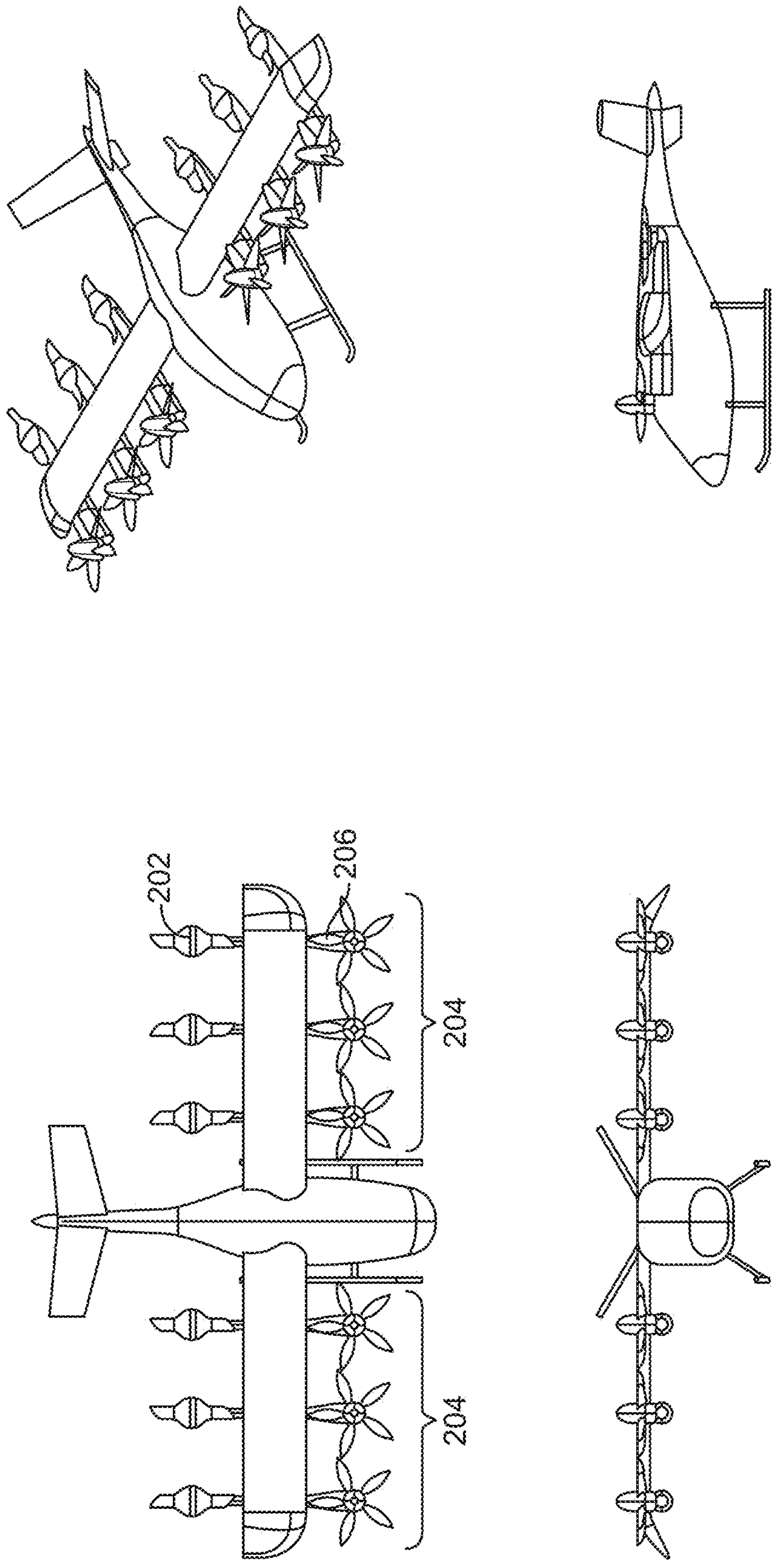
FIG. 2B illustrates top, planar, side and front views (clockwise starting from the top left corner) of the VTOL aircraft with front tilting fan assemblies in the vertical lift position, according to various embodiments.

FIGS. 2A-2B illustrate another exemplary embodiment of the VTOL aircraft with tilting fan assemblies. In the exemplary embodiment illustrated in FIGS. 2A-2B, a plurality of lift fan assemblies are provided at a trailing edge of the pair of wings and a plurality of tilting fan assemblies are provided at a leading edge of the pair of wings. The exemplary VTOL aircraft 200 illustrated in FIGS. 2A-2B includes all front fan assemblies configured as tilting fan assemblies 204. Thus, in the exemplary VTOL aircraft 200, all booms 206 are identical and each includes a tilting fan assembly 204 on one end and a lift fan assembly 202 on the opposite end. Since all booms 206 are identical, the booms 206 may be interchangeable between the positions on the wings. For example, the first boom closer to the fuselage may be interchangeable with the adjacent second boom (e.g. the middle boom on the wing) or the third boom further away from the fuselage. In some embodiments, each tilting fan assembly 204 may be coupled to the boom 206 via an individual tilting mechanism 208. For example, at least three tilting fan assemblies may be coupled to each of the pair of wings, as shown in FIG. 2A.

FIG. 2A illustrates top, planar, side and front views (clockwise starting from the top left corner) of the VTOL aircraft 200 with front tilting fan assemblies 204 in the forward flight position.

FIG. 2B illustrates top, planar, side and front views (clockwise starting from the top left corner) of the VTOL aircraft 200 with front tilting fan assemblies 204 in the vertical lift position (e.g. front tilting fan assemblies 204 facing upward toward the sky).

The control system 250 (e.g. a flight control system) coupled to the aircraft 200 may be configured to control the tilting mechanisms 208 to switch the positioning of the tilting fan assemblies 204 from the forward flight position (illustrated in FIG. 2A) to the vertical lift position (illustrated in FIG. 2B); as well as from the vertical lift position (illustrated in FIG. 2B) to the forward flight position (illustrated in FIG. 2A). According to various embodiments, the control system 250 may control the tilting fan assemblies 204 between the two positions based on sensor data and/or flight data received from the sensors (e.g. sensor measuring air temperature, electric motor temperature, airspeed of the aircraft, etc.), computers, and other input/output devices coupled to the aircraft.

The tilting fan assemblies 204 may be coupled to the wings via one or more tilting mechanisms, and the tilting fan assemblies 204 may be controlled individually via the tilting mechanisms 208. The flight control system may be configured to control the tilting mechanisms 208 simultaneously so as to position all tilting fan assemblies 204 in a same position at the same time. Alternatively, the flight control system may be configured to control the tilting mechanisms 208 independently from each other. This way, the flight control system may identify one or more tilting fan assemblies 204 and control the identified tilting fan assemblies 204 independently from the rest of the tilting fan assemblies. According to various embodiments, the flight control system may use symmetric and/or asymmetric tilting to augment control during hovering and transition (e.g. transition between vertical lift and forward flight). The additional degree of freedom of tilting may augment control during motor out and nominal conditions.

While FIGS. 2A-2B illustrate the tilting fan assemblies 204 on the front (e.g. leading) edge of the wings and the lift fan assemblies 202 on the aft (e.g. tailing) edge of the wings, this configuration is for illustrative purposes and should not be construed as limiting. In some embodiments, the lift fan assemblies 202 may be provided on the leading edge of the wings and the tilting fan assemblies 204 on the trailing edge of the wings.

Yet in other embodiments, the tilting fan assemblies 204 and the lift fan assemblies 202 may be alternated on each one of the front and rear portions of the wings. For example, the leading edge of the first wing may include a first tilting fan assembly 204, a lift fan assembly 202 and a second tilting fan assembly 204. The leading edge of the second wing may include a tilting fan assembly 204, a lift fan assembly 202 and another tilting fan assembly 204. Alternatively, the leading edge of the second wing may include a first lift fan assembly 202, a tilting fan assembly 204, and a second lift fan assembly 202. Similar configurations may be applied to the trailing edge of the first and second wings as well.

While FIGS. 1A-2B illustrate the plurality of tilting fan mechanisms coupled to the wings, in alternative embodiments the plurality of tilting fan mechanisms may be coupled to the fuselage. For example, the plurality of tilting fan mechanisms may be coupled to one or more lateral support structures (e.g. lateral booms) that are coupled to the fuselage.

Figure 3A:
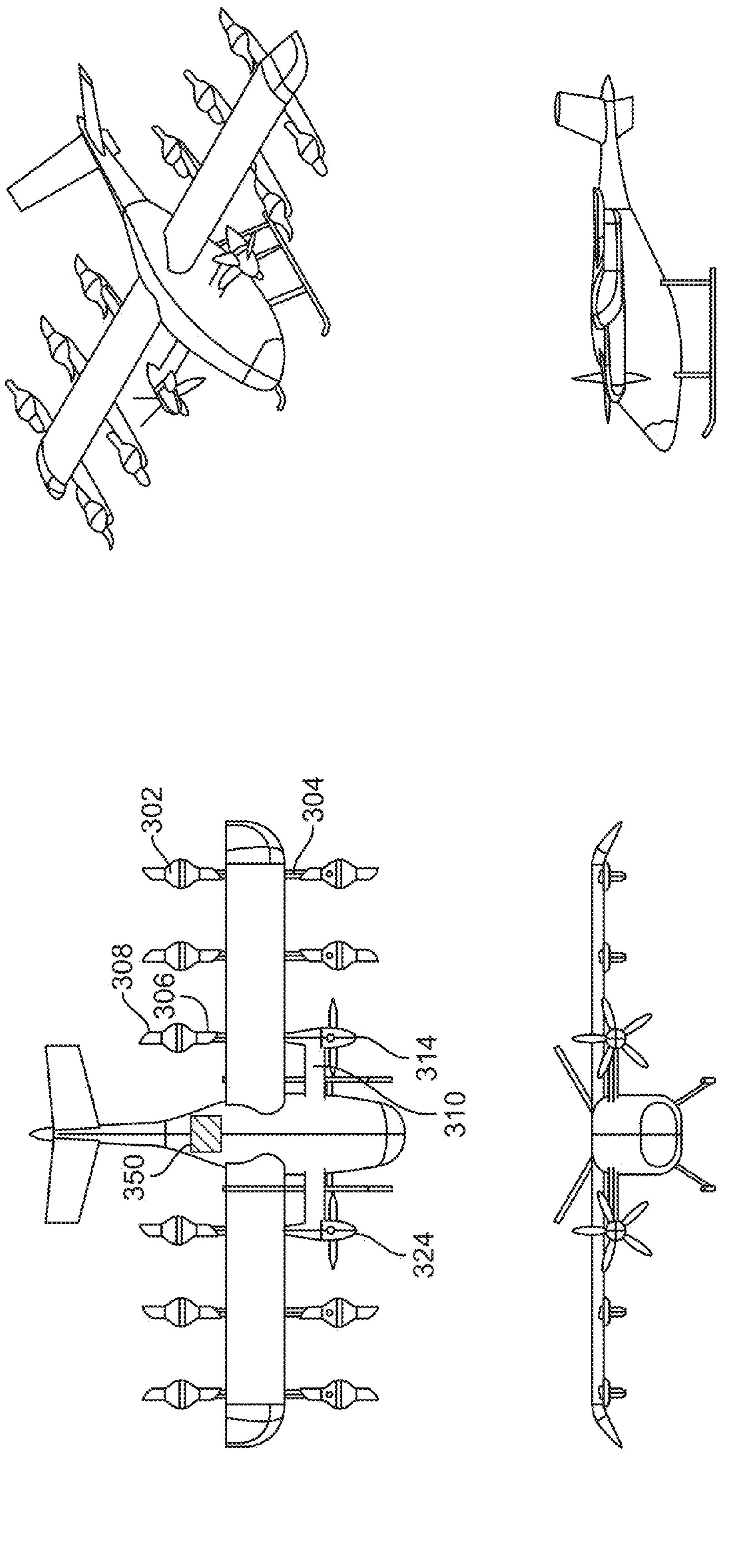
FIG. 3A illustrates top, planar, side and front views (clockwise starting from the top left corner) of the VTOL aircraft with tilting fan assemblies in the forward flight position, according to various embodiments.
Figure 3B:
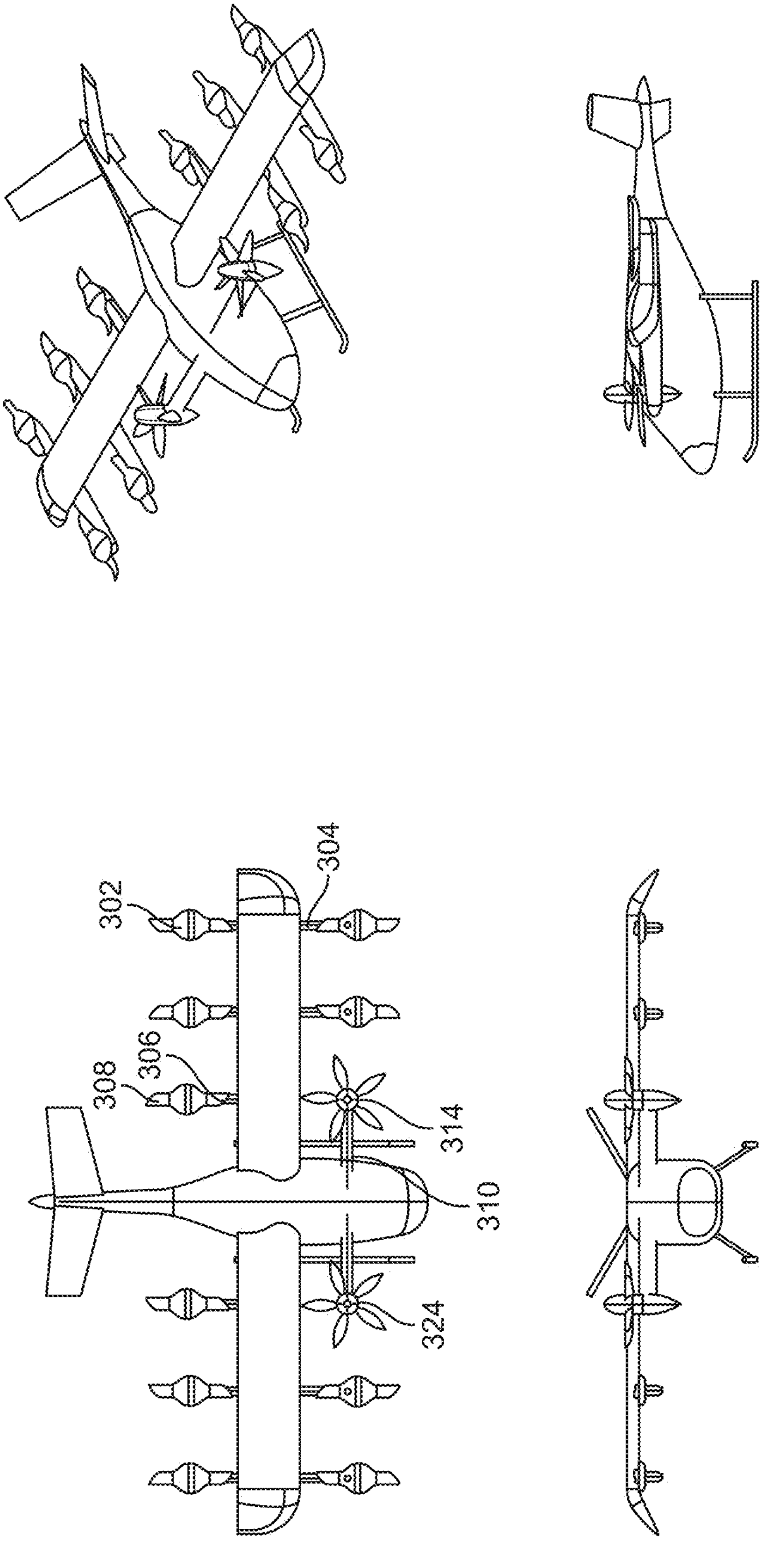
FIG. 3B illustrates top, planar, side and front views (clockwise starting from the top left corner) of the VTOL aircraft with tilting fan assemblies in the vertical lift position, according to various embodiments.

FIGS. 3A-3B illustrate another embodiment of the VTOL aircraft with tilting fan assemblies. The VTOL aircraft 300 illustrated in FIGS. 3A-3B includes a lateral boom 310 provided in front of the wings, closer to a nose of the aircraft. One or more tilting fan assemblies 314, 324 are coupled to the lateral boom 310. In some embodiments, the lateral boom 310 may be a tilting boom tilting around an axis parallel to a lateral axis of the aircraft, thereby moving the tilting fan assemblies 314, 324 at the same time between a forward flight position (illustrated in FIG. 3A) and a vertical lift position (illustrated in FIG. 3B). In such embodiments, it may not be necessary to couple the tilting fan assemblies 314, 324 to the lateral boom 310 via tilting mechanisms if the lateral boom itself is a tilting boom. The tilting of the lateral boom 310 may be controlled to modify the position of the tilting fan assemblies 314, 324. In other embodiments, both the lateral boom and the tilting fan assemblies may tilt independently from each other (e.g. the tilting fan assemblies 314 may be coupled to the tilting lateral boom via one or more tilting mechanisms).

The lateral boom 310 may be formed as a single boom or may be formed as two separate lateral booms coupled to opposite sides of the fuselage. The lateral boom(s) 310 may be coupled to the fuselage forward of the pair of wings.

Similar to the embodiment illustrated in FIGS. 1A-1C, the exemplary VTOL aircraft 300 illustrated in FIGS. 3A-3B includes two booms 304 each carrying a pair of lift fan assemblies 302 on each wing. The exemplary VTOL aircraft 300 further includes a shorter boom 306 coupled to each wing, extending only on one side of each wing (e.g. aft side) carrying a single lift fan assembly 308. As illustrated in FIGS. 3A-3B, the exemplary VTOL aircraft includes 10 lift fan assemblies and 2 tilting fan assemblies.

FIG. 3A illustrates top, planar, side and front views (clockwise starting from the top left corner) of the VTOL aircraft 300 with tilting fan assemblies 314, 324 in the forward flight position.

FIG. 3B illustrates top, planar, side and front views (clockwise starting from the top left corner) of the VTOL aircraft 300 with tilting fan assemblies 314, 324 in the vertical lift position.

The control system 350 (e.g. the flight control system) coupled to the aircraft 300 may be configured to control the tilting fan assemblies 314, 324 from the forward flight position (illustrated in FIG. 3A) to the vertical lift position (illustrated in FIG. 3B); as well as from the vertical lift position (illustrated in FIG. 3B) to the forward flight position (illustrated in FIG. 3A). According to various embodiments, the control system may control the tilting of the tilting fan assemblies 314, 324 between the two positions based on sensor data and/or flight data received from the sensors (e.g. sensor measuring air temperature, electric motor temperature, airspeed of the aircraft, etc.), computers, and other input/output devices coupled to the aircraft.

In embodiments where the lateral boom 310 is a tilting boom, the control system 350 may be configured to control the tilting of the lateral boom 310 to switch the positioning of the tilting fan assemblies 314, 324 from the forward flight position (illustrated in FIG. 3A) to the vertical lift position (illustrated in FIG. 3B); as well as from the vertical lift position (illustrated in FIG. 3B) to the forward flight position (illustrated in FIG. 3A). According to various embodiments, the control system may control the tilting of the lateral boom 310 between the two positions based on sensor data and/or flight data received from the sensors (e.g. sensor measuring air temperature, electric motor temperature, airspeed of the aircraft, etc.), computers, and other input/output devices coupled to the aircraft.

In some embodiments, the lateral boom 310 may be provided behind the wings, closer to a tail of the aircraft (or on the tail of the aircraft). In such embodiments, the shorter boom 306 that extends only on one side of each wing carrying a single lift fan assembly 308 may extend toward the leading edge of the wing(s).

According to an alternative embodiment, the tilting fan assemblies 314, 324 may be coupled to the lateral boom 310 via respective tilting mechanisms. Thus, the lateral boom 310 itself may or may not be a tilting boom. In such embodiments, the tilting fan assemblies 314, 324 may be controlled to switch position (between the vertical lift position and forward flight position) individually. In such embodiments, it may still be possible to do an emergency landing by eliminating a failed (e.g. broken or stuck) tilting fan assembly, and controlling the remaining tilting fan assemblies from a forward flight position to a vertical lift position. For example, the tilting fan assemblies 314, 324 may be individually controlled to switch position at the same time. Yet according to another example, the tilting fan assemblies 314, 324 may be individually controlled to switch position at different times (e.g. consecutively, one after another).

According to various embodiments, any number of lift fan assemblies may be coupled to the VTOL aircraft. For example, the aircraft may include 3 lift fan assemblies coupled to each wing (as shown in FIG. 2A), or the aircraft may include 5 lift fan assemblies coupled to each wing (as shown in FIGS. 1A and 3A). Other embodiments may include no lift fan assemblies (e.g. the lift is created using the tilting fan assemblies in the vertical position, therefore the aircraft may include any number of tilting fan assemblies), 2 lift fan assemblies, 4 lift fan assemblies, or 6 (or more) lift fan assemblies. According to various embodiments, the combined number of lift fan assemblies and the tilting fan assemblies coupled to the aircraft may be at least 12.

In various embodiments, a control system such as the flight control system of the aircraft may be configured to control the actuators (rotors, aerodynamic control surfaces, the tilting fan assemblies, the lift fan assemblies) of the aircraft to cause the aircraft to transition between a vertical lift (e.g. liftoff/hovering/landing) mode and a forward flight mode. For example, the control system may be configured to receive a flight instruction, such as a liftoff instruction, a hovering instruction, a landing instruction or a forward flight instruction. If the flight instruction is a takeoff instruction or a landing instruction, the control system may control the one or more of the plurality of tilting fan assemblies that are in the forward flight position to the vertical lift position. If the flight instruction is a forward flight instruction, the control system may control the one or more of the plurality of tilting fan assemblies that are in the vertical lift position to the forward flight position. The control system may then determine a position of a plurality of tilting fan assemblies coupled to the aircraft and control one or more of the plurality of tilting fan assemblies between a vertical lift position and a forward flight position based on the flight instruction. The control system may continuously monitor the position of the plurality of tilting fan assemblies in view of the flight instruction.

Figure 4:
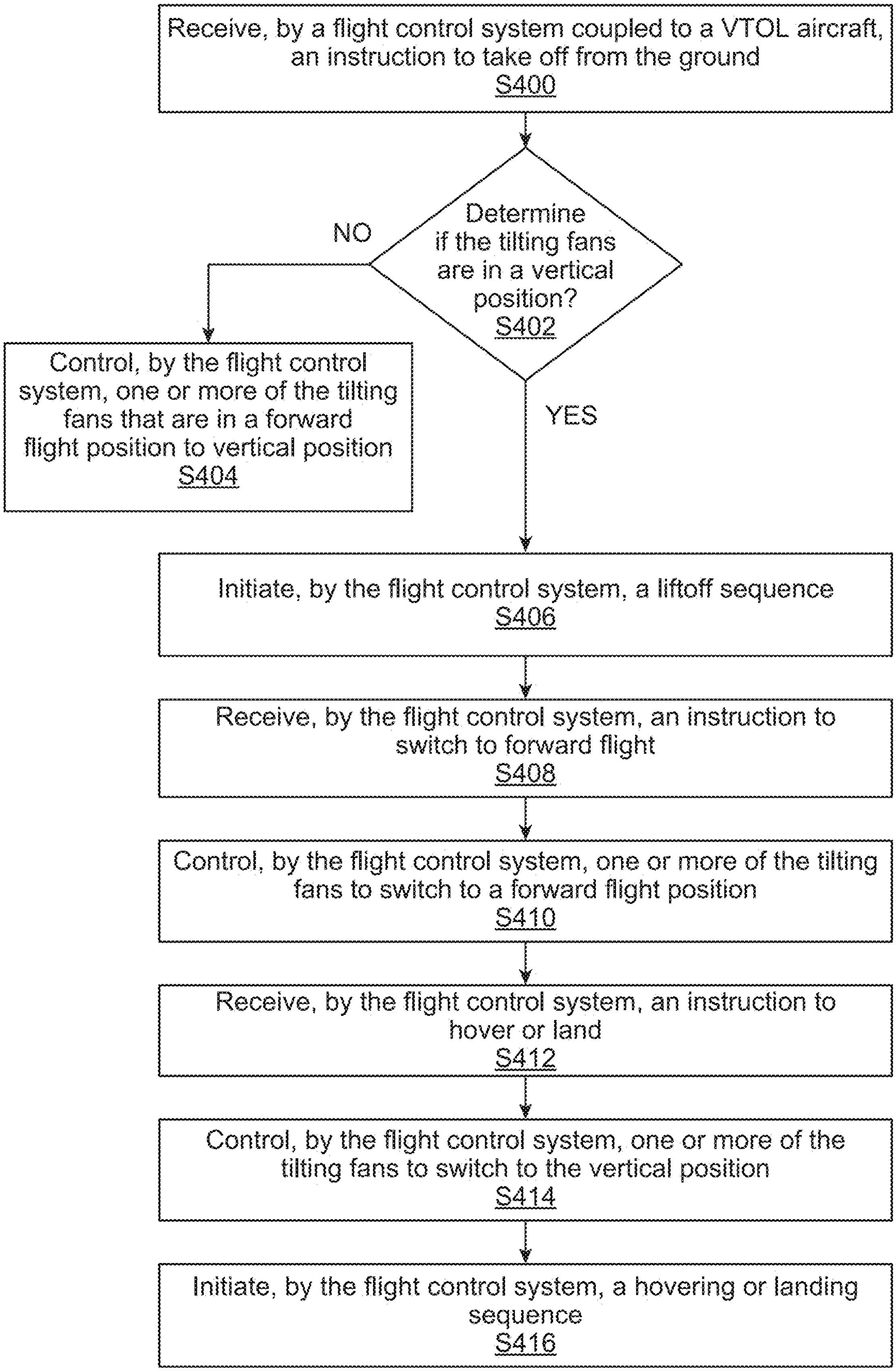
FIG. 4 is a flow chart illustrating an embodiment of a process to control flight of a VTOL aircraft through a transition between vertical and forward flight, according to various embodiments.

FIG. 4 is a flow chart illustrating an embodiment of a process to control flight of a VTOL aircraft configured for vertical takeoff and landing through a transition between vertical lift and forward flight.

At step S400, the aircraft may be in a stationary position on the ground. For example, the aircraft may be parked at a charging station for charging the batteries. Alternatively, the aircraft may be parked at a location awaiting to receive cargo or passengers. The flight control system of the VTOL aircraft may receive a flight plan (e.g. from the autopilot, a pilot or a remote controller pilot) to arrive at a predetermined destination. The flight plan may include an instruction to takeoff from the ground.

At step S402, the flight control system may determine whether all tilting fan assemblies of the aircraft are in a vertical lift position. According to various embodiments, it may be desirable to have all fan assemblies in the vertical lift position to create a vertical lift. In some embodiments, the aircraft may be configured to keep all tilting fan assemblies in a vertical lift position when the aircraft is not in use (e.g. is parked on the ground or is being charged).

If it is determined, at step S402, that not all fan assemblies are in a vertical lift position, the flight control system may control one or more of the tilting fan assemblies that are in a forward flight position to switch to a vertical lift position (step S404). For example, one or more of the tilting fan assemblies may have been switched to the forward flight position while the aircraft was on the ground for testing or maintenance purposes.

At step S406, the flight control system may initiate a takeoff sequence to lift the aircraft off of the ground. During the takeoff sequence, the lift fan mechanisms and the tilting fan mechanisms in a vertical lift position may all be activated.

At step S408, after a certain amount of time has passed since performing step S406, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g. a remote control tower. a remote pilot).

In various embodiments, transition to forward flight may be effected by attaining a desired altitude (e.g., design minimum or greater than a threshold) and rotating the tilting fan assemblies substantially continuously to a forward flight position, while adjusting power to the rotors as required to maintain stability and altitude while increasing forward airspeed as the tilting fan assemblies are rotated into the forward flight position and begin to generate sufficient lift to maintain altitude.

Upon receiving the instruction to transition to forward flight, at step S410, the control system may control one or more of the tilting fan assemblies to switch from a vertical lift position to a forward flight position. In some embodiments, the tilting fan assemblies may be controlled substantially simultaneously.

At step S412, the control system may receive an instruction (e.g. from the autopilot, a pilot or a remote entity) to hover or to land. In response, at step S414, the flight control system may control one or more of the tilting fan assemblies to switch from the forward flight position to the vertical lift position. At step S416, the flight control system may initiate a hovering or landing sequence to hover or land the aircraft on the ground.

The various embodiments discussed herein are illustrated in FIGS. 1A-3B using an aircraft with a specific tail. However, the embodiments are not limited to the specific tail or aircraft configuration illustrated in the figures. One or ordinary skill in the art will appreciate that the embodiments can be combined with aircraft with alternative tails or with alternative designs, including but not limited to an aircraft with a conventional tail, an aircraft with multiple tails, or an aircraft with no tail.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front or "back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

What is claimed is:

1. An aircraft configured for vertical takeoff and landing, the aircraft comprising:

a fuselage;

a pair of wings coupled to opposite sides of the fuselage;

a plurality of lift fan assemblies coupled to the pair of wings, wherein the plurality of lift fan assemblies are configured to create a vertical lift;

a pair of tilting fan assemblies configured to move between a vertical lift position and a forward flight position, wherein the pair of tilting fan assemblies are configured to create a vertical lift when in the vertical lift position;

a plurality of support structures coupled to each one of the pair of wings, wherein:

each of a set of lift fan assemblies among the plurality of lift fan assemblies is non-tiltably mounted to a first end of each support structure, each of a pair of lift fan assemblies among the plurality of lift fan assemblies is non-tiltably mounted to a second end of a support structure among the plurality of support structures on each side of the fuselage, each tilting fan assembly among the pair of tilting fan assemblies is coupled to a second end of a pair of support structures among the plurality of support structures via a tilting mechanism, the set of lift fan assemblies are provided at a trailing edge of the pair of wings, the pair of tilting fan assemblies are provided at a leading edge of the pair of wings, and the pair of lift fan assemblies on each side of the fuselage are provided at the leading edge of the pair of wings; and a control system configurable to activate and deactivate the plurality of lift fan assemblies and control the pair of tilting fan assemblies between the vertical lift position and the forward flight position, wherein entire forward thrust needed for the aircraft is provided by all tilting assemblies coupled to the plurality of support structures when in the forward flight position.

2. The aircraft of claim 1, further comprising:

one or more battery units including a plurality of battery cells configured to power the pair of tilting fan assemblies and the plurality of lift fan assemblies.

3. The aircraft of claim 1 further comprising: a tailplane in form of a V-tail coupled to a rear end of the fuselage.

4. The aircraft of claim 1, wherein the pair of wings are coupled to the fuselage in a high-wing configuration.

5. The aircraft of claim 1, wherein the plurality of lift fan assemblies are mounted in a fixed position relative to the pair of wings to move the aircraft in a vertical direction.

6. The aircraft of claim 1, wherein one or more of the plurality of lift fan assemblies are configurable to stop operating during a forward flight of the aircraft.

7. The aircraft of claim 1, wherein each of the plurality of lift fan assemblies comprise an electric motor-driven rotor.

8. The aircraft of claim 1, wherein five lift fan assemblies are coupled to each of the pair of wings, and wherein a combined number of lift fan assemblies and tilting fan assemblies is at least 12.

9. The aircraft of claim 1, wherein the control system is configurable to:

receive a flight instruction;

determine a position of the pair of tilting fan assemblies;

control the pair of tilting fan assemblies between the vertical lift position and the forward flight position based on the flight instruction; and continuously monitor the position of the pair of tilting fan assemblies in view of the flight instruction.

10. The aircraft of claim 1, wherein the control system is configurable to:

control the position of the pair of tilting fan assemblies based on flight data received by sensors coupled to the aircraft.

11. The aircraft of claim 1, wherein the control system is configurable to:

automatically control a position of the pair of tilting fan assemblies based on a flight plan from a remote entity.

12. A method for controlling an aircraft, the method comprising:

generating, by a control system coupled to the aircraft of claim 1, a flight instruction;

controlling, by the control system, one or more of plurality of lift fan assemblies between an active and an inactive status based on the flight instruction;

controlling, by the control system, one or more of the pair of tilting fan assemblies between a vertical lift position and a forward flight position based on the flight instruction; and continuously monitoring, by the control system, the position of the pair of tilting fan assemblies in view of the flight instruction.

13. The method of claim 12, further comprising:

controlling, by the control system, a first tilting fan assembly and a second tilting fan assembly among the pair of tilting fan assemblies independently from each other.

14. The method of claim 12, further comprising:

controlling, by the control system, the pair of tilting fan assemblies simultaneously.

15. The method of claim 12, further comprising:

automatically controlling, by the control system, a position of the pair of tilting fan assemblies based on a flight plan from a remote entity.

16. The method of claim 12, wherein the flight instruction is a takeoff instruction, and wherein controlling the one or more of the pair of tilting fan assemblies comprises:

determining whether each of the pair of tilting fan assemblies is in the vertical lift position; and controlling the one or more of the pair of tilting fan assemblies to the vertical lift position.

17. The method of claim 12, wherein the flight instruction is a hover instruction or a landing instruction, and wherein controlling the pair of tilting fan assemblies comprises:

controlling the pair of tilting fan assemblies to the vertical lift position.

18. The method of claim 12, wherein the flight instruction is an instruction to switch to forward flight, and wherein controlling the pair of tilting fan assemblies comprises:

controlling the pair of tilting fan assemblies to the forward flight position.

19. The method of claim 18, further comprising:

controlling one or more of the plurality of lift fan assemblies to stop operating during a forward flight of the aircraft.

20. The method of claim 12, further comprising:

receiving, by the control system, flight data from one or more sensors coupled to the aircraft; and controlling the position of the pair of tilting fan assemblies based on the flight data received from the one or more sensors coupled to the aircraft.

21. The aircraft of claim 1, wherein propellers coupled to the aircraft is comprised of the plurality of lift fan assemblies and the pair of tilting fan assemblies.

* * * * *